W. O. DOWNEY.
TRACTION ROLLER.
APPLICATION FILED FEB. 8, 1918.

1,292,273.

Patented Jan. 21, 1919.

Inventor
William O. Downey
By C. D. Haskins
Attorney ced by a bar 31 disposed lengthwise of the
UNITED STATES PATENT OFFICE.

WILLIAM O. DOWNEY, OF MOUNT VERNON, WASHINGTON.

TRACTION-ROLLER.

1,292,273.   Specification of Letters Patent.   Patented Jan. 21, 1919.

Application filed February 8, 1918. Serial No. 216,133.

*To all whom it may concern:*

Be it known that I, WILLIAM O. DOWNEY, citizen of the United States, residing at Mount Vernon, in the county of Skagit and State of Washington, have invented a certain new and useful Improvement in Traction-Rollers, of which the following is a specification.

My invention relates to improvements in rollers, and more particularly to improvements in traction rollers for agricultural purposes as for rolling land, and the object of my invention is to provide a roller of this nature in which the tractive or driving power is communicated directly to certain ones of the rolls.

Another object of my invention is to provide a roller of novel construction which consists of parts that may be combined with the frame and power plant of an automobile to form a strong and efficient tractor implement of this class.

A further object is to provide novel and efficient means for securing a roller on the front end of the tractor frame and novel and efficient guiding apparatus that may be connected with the front roller to guide the tractor.

I accomplish these objects by devices illustrated in the accompanying drawings wherein—

Figure 1:
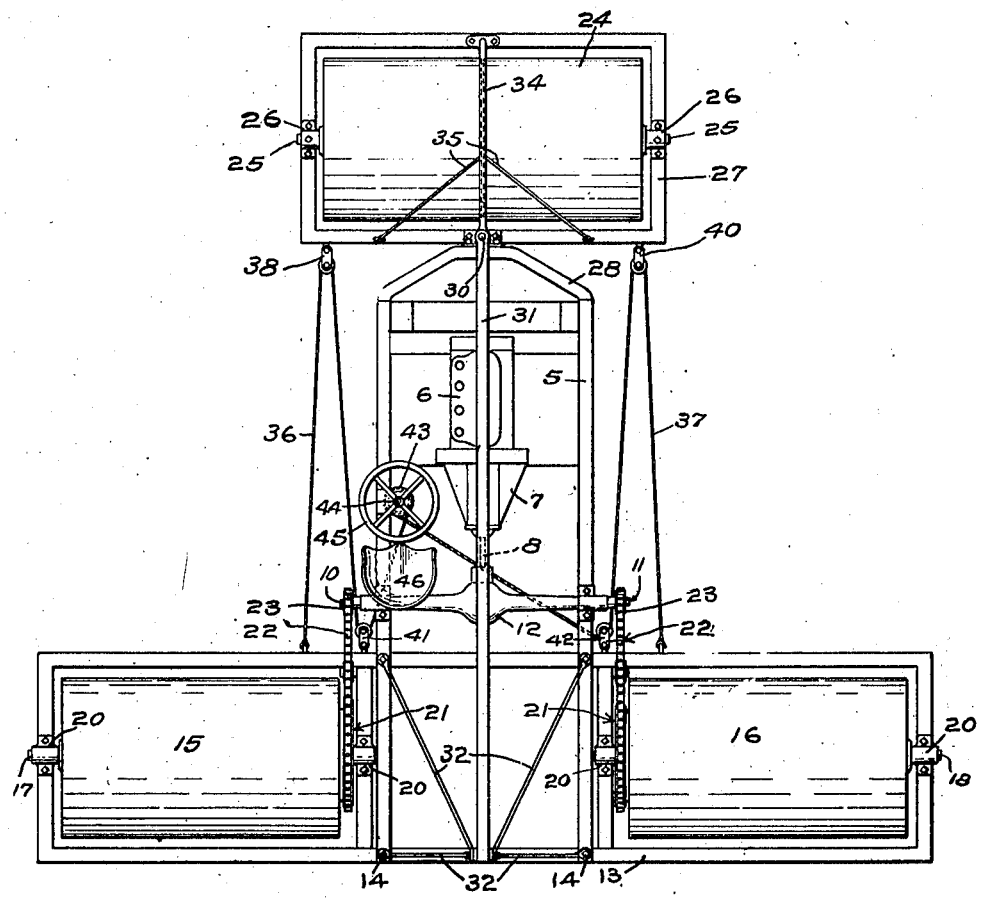
Figure 2:
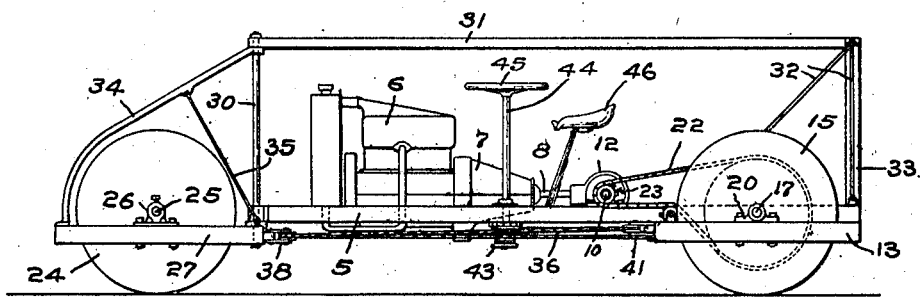

Figure 1 is a plan view of a traction roller constructed in accordance with my invention; and Fig. 2 is a view in side elevation of the same.

Referring to the drawings, throughout which like reference numerals indicate like parts, the numeral 5 designates a rectangular frame, hereinafter called a motor frame, which may be the frame of any ordinary automobile and which is provided with an engine 6 that is connected with a drive shaft 8 by suitable reduction speed gears disposed within a housing 7.

The drive shaft 8 transmits power to two transversely disposed axles 10 and 11 through a suitable differential mechanism located in a differential housing 12.

13 is a rectangularly shaped roller frame that is disposed crosswise of the motor frame 5 at the rear end thereof and is rigidly secured thereto as by bolts 14.

The frame 13 is provided at the sides of the frame 5 with rolls 15 and 16 that have axial bearing shafts 17 and 18, respectively, and are journaled in boxings 20.

The inner ends of the rolls 15 and 16 are each provided with relatively large sprocket wheels 21 that are connected by drive chains 22 with sprocket pinions 23 on the ends of axles 10 and 11 whereby when the axles are rotated the rolls 15 and 16 will be driven in substantially the same manner as are the wheels of a chain driven truck.

The front end of the frame 5 is supported by a roll 24 having axial bearing studs or shafts 25 that are mounted for rotation within boxings 26 in a small rectangular frame 27.

The frame 5 is provided on the front end with a tapering extension 28 to the foremost portion of which is secured a vertically arranged king-bolt 30.

The top end of the king-bolt 30 is supported by a bar 31 disposed lengthwise of the middle portion of the frame 5 and rigidly held in position thereabove by a plurality of truss rods 32 and a vertical post 33 located at the rear end of the frame 5.

The rear side of the small front frame 27 is pivoted on the bottom end of the king-bolt 30 below the frame 5 and the front side of frame 27 is secured to a rigid arched member 34 that extends upwardly over the roll 24 and is pivotally connected with the top end of the king-bolt 30.

The upper portion of the arched member 34 is supported by divergent truss rods 35 that are secured to the rear portion of the frame 27.

By the construction above described it will be obvious that the front roll 24 is so arranged as to permit it to be turned about the king-bolt 30 to guide the tractor, the tapering extension 28 on the front end of the frame 5 permitting the tractor to be turned through a considerable angle without interfering with the frame 5.

The tractor may be guided by cables 36 and 37 that are each secured at one end to the frame 13 thence pass forwardly through pulleys 38 and 40, respectively, that are secured near opposite ends of the frame 27, thence rearwardly through pulleys 41 and 42, respectively, that are secured to the frame 13 and thence to and around a small drum 43 on the lower end of a steering post 44, the cables 36 and 37 being wound in opposite directions on the drum 43 so that when the steering post 41 is turned one of the cables will be unwound from and the other cable wound upon the drum 43 to turn the front roller frame 27 into an angular position.

A steering wheel 45 is provided on the top end of the steering post 44 and a seat 46 is provided near the steering wheel for the operator of the machine.

When the tractor is proceeding in a straight line across a field the front roll 24 will roll the strip of ground that would otherwise be left between the two inner ends of the rolls 15 and 16.

When the device is in operation the two rolls 15 and 16 operate in substantially the same manner as wheels to drive the device in a forward or backward direction and the machine is guided by turning the front roll 24 at other than right angles to the frame 5 by the use of the cables 36 and 37.

If desired the cables 36 and 37 may extend directly from the drum 43 to the ends of the frame 27 instead of passing over the several pulleys as shown.

It will be understood that the use of my invention is not limited to rolling land but that it may be used on pavements and in various other work where it is desirable to use a heavy roller.

Obviously, changes may be made in the form of construction and arrangement of various parts of my invention without departing from the spirit thereof.

What I claim is:

1. A machine of the class described, comprising a motor frame, a motor mounted thereon, rolls mounted for rotation at the sides of said motor frame adjacent the rear end thereof, driving mechanism connecting said rolls with said motor, a king-bolt extending from the front end of said motor frame, means for rigidly supporting the top end of said king-bolt, a small rectangular roller frame pivoted on the bottom end of said king-bolt, an arched member secured to the front side of said small rectangular frame and pivotally connected with the top end of said king-bolt, a roller mounted for rotation within said small rectangular frame, a steering post, a drum connected therewith, and two cables wound in opposite directions around said drum and connected with opposite ends of said small rectangular frame to turn said frame and guide said machine.

2. A machine of the class described, comprising a rectangular frame, an engine on said frame, differential axles disposed transversely of said frame, a driving shaft connecting said engine and said differential axles for driving said axles, a long rectangular roller frame disposed crosswise of the rear end of said first named frame and rigidly secured thereto, rollers mounted for rotation in said long rectangular frame at each side of said first named frame, sprocket wheels on the inner ends of said rollers, sprocket pinions on said differential axles, drive chains connecting said sprocket pinions and said sprocket wheels for driving said rollers, an angular extension on the front end of said first named frame, a vertical king-bolt extending upwardly from said extension, a rigid trussed bar extending rearwardly above the center of said first named frame and supporting the top end of said king-bolt, a small rectangular frame pivoted on the bottom end of said king-bolt, a roller mounted for rotation within said small rectangular frame said roller being of sufficient length to span the distance between the inner ends of said first named rollers, an arched member secured to the front side of said small rectangular frame and pivotally connected with the top end of said king-bolt, a steering post having a hand wheel, a drum secured to said steering post, and two cables wound in opposite directions on said drum thence passing over pulleys on said long rectangular frame, thence passing forwardly and around pulleys on the ends of said front roller frame and thence passing rearwardly and being fixedly secured to said long rectangular frame whereby the front roller may be guided.

In witness whereof, I hereunto subscribe my name this 31st day of January A. D., 1918.

WILLIAM O. DOWNEY.